United States Patent
Zavesky et al.

(10) Patent No.: US 10,963,918 B1
(45) Date of Patent: Mar. 30, 2021

(54) APPARATUS AND METHOD FOR PRESENTATION OF IN-STORE VISUALIZATIONS AND/OR SUPPLY OF PRODUCTS TO CUSTOMERS

(71) Applicant: AT&T Intellectual Property I, L.P., Atlanta, GA (US)

(72) Inventors: Eric Zavesky, Austin, TX (US); James Pratt, Round Rock, TX (US); Timothy Innes, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/589,979

(22) Filed: Oct. 1, 2019

(51) Int. Cl.
*G06Q 30/02* (2012.01)
*G06F 3/14* (2006.01)
(Continued)

(52) U.S. Cl.
CPC ....... *G06Q 30/0261* (2013.01); *G05D 1/0094* (2013.01); *G06F 3/1423* (2013.01);
(Continued)

(58) Field of Classification Search
CPC ...................................................... G06Q 30/02
See application file for complete search history.

(56) References Cited

U.S. PATENT DOCUMENTS

| | | | |
|---|---|---|---|
| 9,892,424 B2 * | 2/2018 | Abraham ............ | G06Q 30/0251 |
| 2008/0249835 A1 * | 10/2008 | Angell ................ | G06Q 30/0204 705/7.33 |
| 2016/0253735 A1 * | 9/2016 | Scudillo ............ | G06Q 30/06 705/14.58 |

FOREIGN PATENT DOCUMENTS

WO    WO2019/069324 A1 *   4/2019   ............ G06Q 10/08

OTHER PUBLICATIONS

Howell, Daniel, Systems and Methods for Controlling a Display of Content in a Retail Store Apr. 19, 2018 (Year: 2018).*

(Continued)

*Primary Examiner* — Marilyn G Macasiano
(74) *Attorney, Agent, or Firm* — Guntin & Gust, PLC; Ralph Trementozzi

(57) ABSTRACT

Aspects of the subject disclosure may include, for example, receiving information associated with a first shopper of a plurality of shoppers from a monitoring device monitoring for presence of the plurality of shoppers; detecting, according to the information, entry into a store by the first shopper; identifying (responsive to detecting the entry) the first shopper, resulting in a first identification; generating (based upon the first identification) a first layout, the first layout comprising for each of a plurality of display screens situated along a route a respective visualization to be displayed, each respective visualization being part of a plurality of visualizations; detecting (responsive to receiving first motion data from the monitoring device) first movement by the first shopper to a first location that is proximal to a first display screen of the plurality of display screens; providing on the first display screen (responsive to detecting the first movement to the first location) a first visualization of the plurality of visualizations; detecting (responsive to receiving second motion data from the monitoring device) second movement by the first shopper to a second location that is different from the first location and that is proximal to a second display screen of the plurality of display screens; and providing on the second display screen (responsive to detecting the second movement to the second location) a second visualization of the plurality of visualizations, the second visualization being different from the first visualization. Other embodiments are disclosed.

20 Claims, 11 Drawing Sheets

(51) Int. Cl.
*G05D 1/00* (2006.01)
*H04W 4/021* (2018.01)
*G01C 21/20* (2006.01)

(52) U.S. Cl.
CPC .......... *H04W 4/021* (2013.01); *G01C 21/206* (2013.01); *G05D 2201/0216* (2013.01)

(56) References Cited

OTHER PUBLICATIONS

"Amazon", www.amazon.com, 5 pages.
"Amazon Go", Wikipedia, Sep. 20, 2019, 5 pages.

* cited by examiner

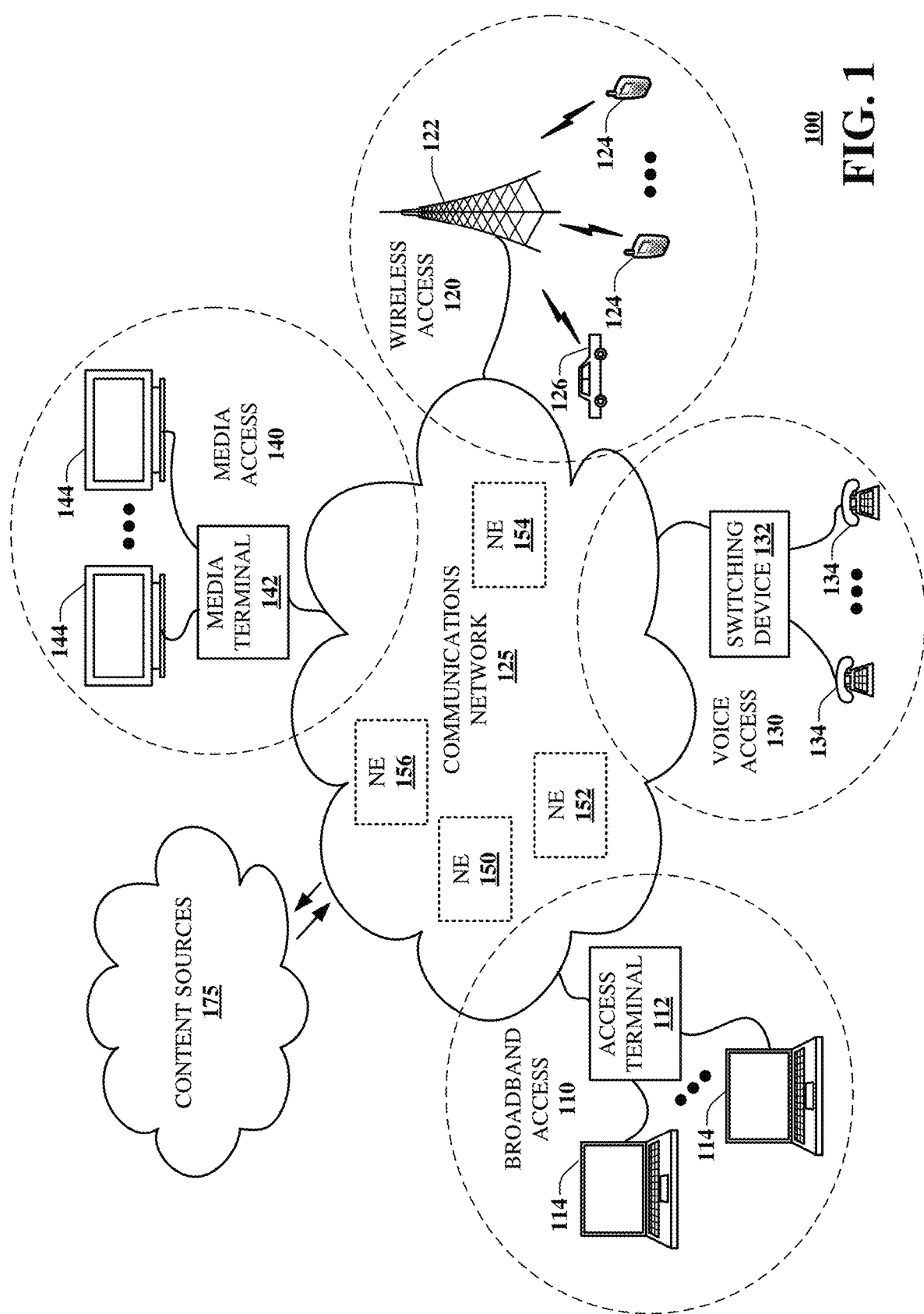

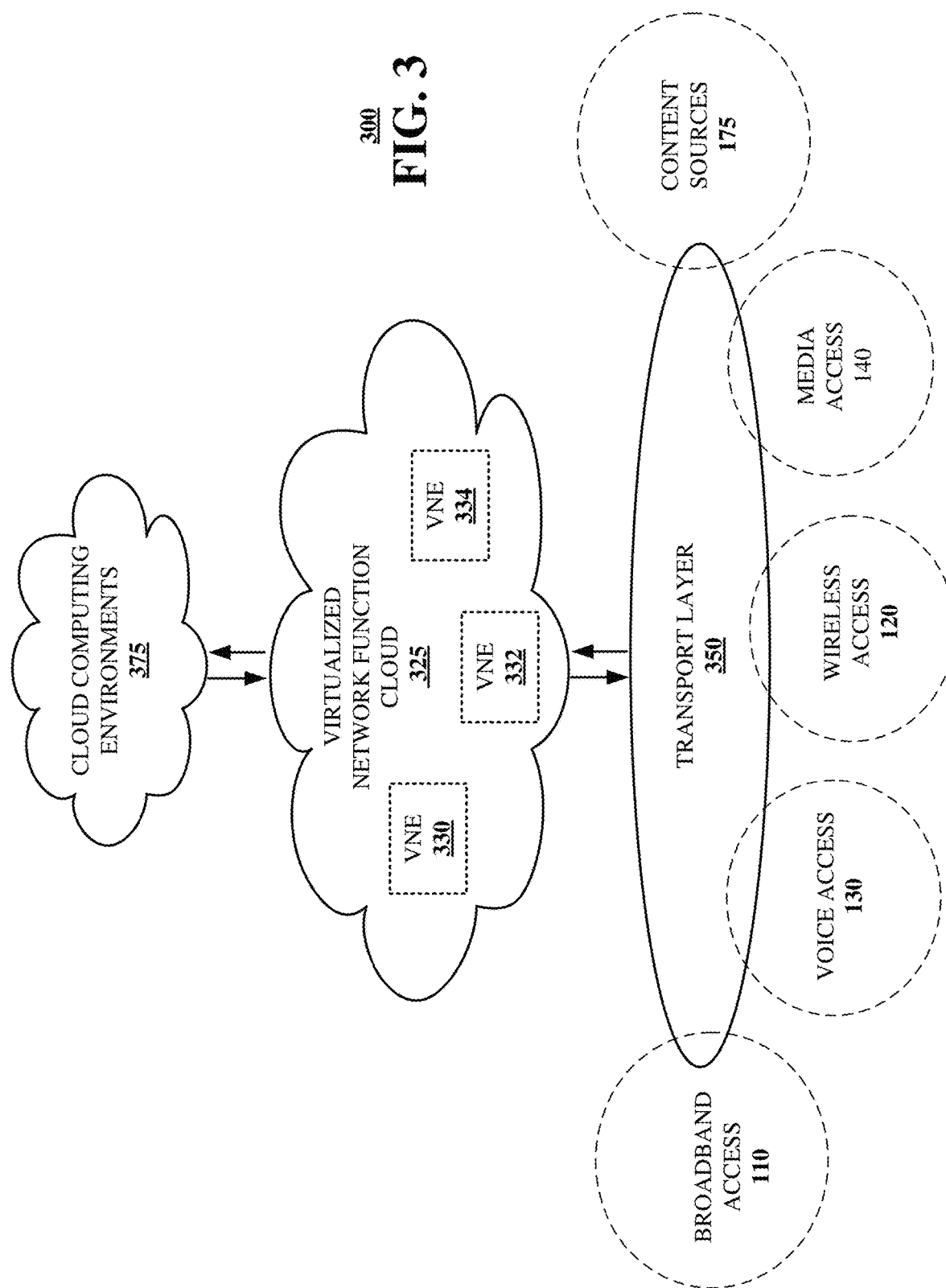

US 10,963,918 B1

APPARATUS AND METHOD FOR PRESENTATION OF IN-STORE VISUALIZATIONS AND/OR SUPPLY OF PRODUCTS TO CUSTOMERS

FIELD OF THE DISCLOSURE

The subject disclosure relates to an apparatus and method for presentation of in-store visualizations and/or supply of products to customers.

BACKGROUND

Certain aspects of a conventional in-store shopping experience are improving (e.g. AMAZON GO) but such conventional in-store shopping experiences are not necessarily personalized. In addition, in certain circumstances, the available amount of conventional in-store retail space is shrinking, but such space is often used inefficiently for the customers that the space serves.

BRIEF DESCRIPTION OF THE DRAWINGS

Reference will now be made to the accompanying drawings, which are not necessarily drawn to scale, and wherein:

FIG. 1 is a block diagram illustrating an example, non-limiting embodiment of a communication network in accordance with various aspects described herein.

FIG. 3 is a block diagram illustrating an example, non-limiting embodiment of a virtualized communication network in accordance with various aspects described herein.

DETAILED DESCRIPTION

Figure 2A:
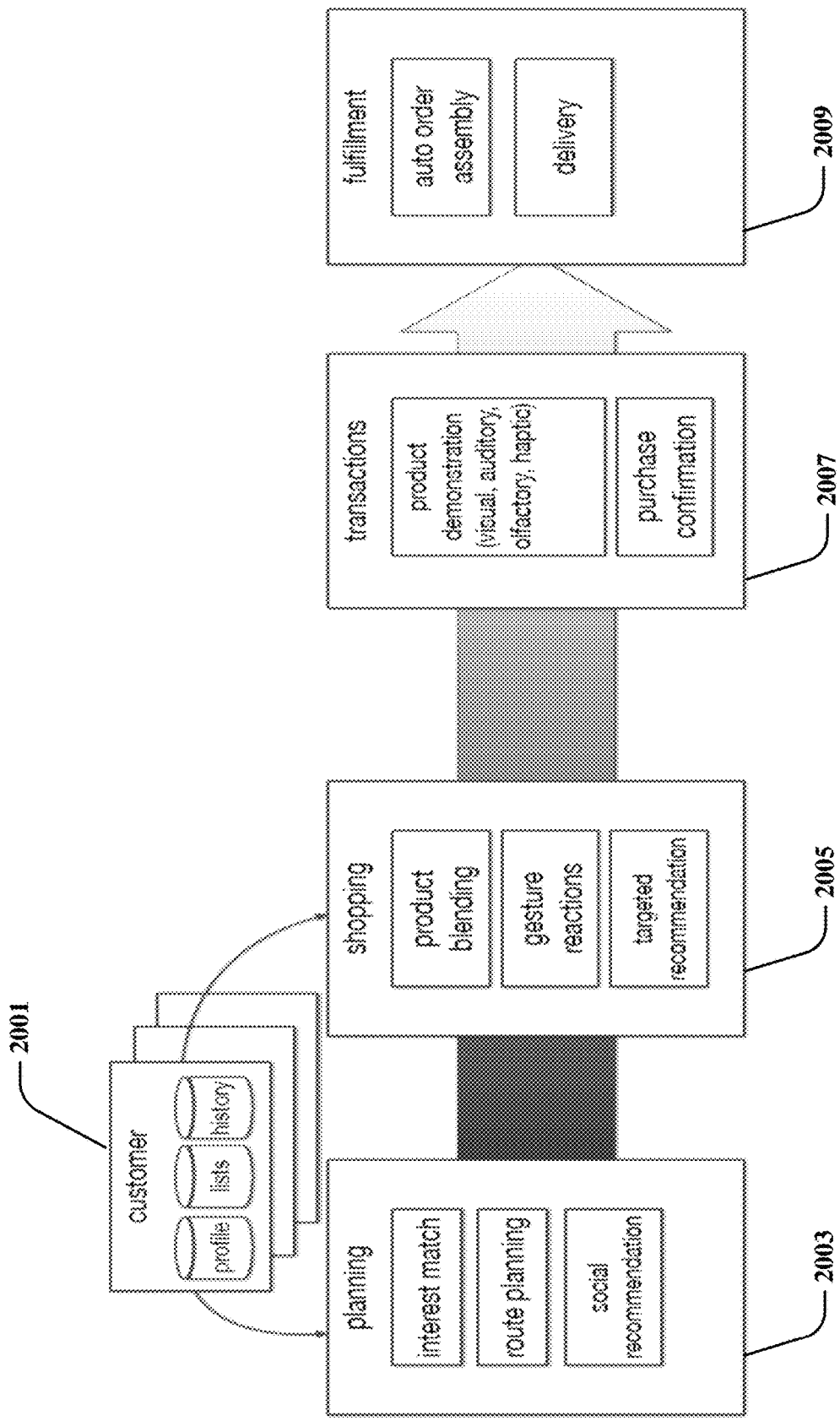
FIG. 2A is a block diagram illustrating an example, non-limiting embodiment of a process functioning within the communication network of FIG. 1 in accordance with various aspects described herein.

The subject disclosure describes, among other things, illustrative embodiments for presentation of in-store visualizations and/or supply of products to customers. Other embodiments are described in the subject disclosure.

As described herein, various embodiments provide mechanisms via which needs and/or wants of users can be responded to more quickly. This can be accomplished, for example, through the use of knowledge of customer(s), knowledge of product(s) and/or availability of other items.

As described herein, various embodiments provide mechanisms for advertising (e.g., product advertising) that is presented in the physical world (e.g., that is presented at an in-store retail venue).

As described herein, various embodiments provide mechanisms for dynamic stocking of retail stores (e.g., real-time placement of products on store shelves).

Referring now to FIG. 1, a block diagram is shown illustrating an example, non-limiting embodiment of a communication network 100 in accordance with various aspects described herein. For example, communication network 100 can facilitate in whole or in part presentation of in-store visualizations and/or supply of products to customers as described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Referring now to FIG. 2A, an example process 2000 according to an embodiment will be described. This example process will be described primarily in connection with customer 2001 (of course, the process can be carried out for any desired number of customers, each being associated with their own corresponding profiles, lists and history). As seen, customer 2001 has associated therewith a profile, lists and history. When customer 2001 enters a store, the customer 2001 is tracked visually and/or via electronic location tracking. In various specific examples, the tracking can be via passive identification and/or authentication (e.g., facial recognition, biometrics, etc.). The planning portion of this process (see element 2003) can comprise an interest match, route planning and one or more social recommendations. In one example, the planning portion of this process can utilize the profile, lists and/or history of customer 2001. In one example, the planning portion of this process can operate via query. In one example, the planning portion of this process can populate an immediate need as follows: (1) resolve preferences of most proximal person; (2) use typical shopping list as starting point for helping people to start shopping; (3) blend the stocking needs of multiple users for store-layout optimization and kiosk presentation; and/or (4) integrate shopping list that people have included to lead users on a "journey" of different shelves.

Still referring to FIG. 2A, the shopping portion of this process (see element 2005) follows the planning portion of the process. As seen, the shopping portion of this process can comprise product blending, gesture reactions and targeted recommendation. In one example, the shopping portion of this process can utilize the profile, lists and/or history of customer 2001. In one example, the shopping portion of this process can facilitate visualization of a virtual item in nearby shelves as follows: (1) connect to one or more augmented reality (AR) devices of customer 2001 and/or use kiosk-based visualizations (e.g., simulations); (2) for more interactions with an object, can extend to virtual reality (VR) and/or haptic feedback/exploration; (3) integrate with camera/gaze detection to determine what the user is inspecting on object to allow situational comparison of items in category; (4) enable gestures (such as via one or more user interfaces) to "swipe" to different set of items and/or filters; zoom and explore AR space with kiosk screen usage. In various examples, different kiosks can have different mixed reality capabilities (e.g., smell (e.g., in the context of a bakery), feel, taste, heat, etc.). In various examples, situational advertisements (e.g., based on a location of a user) can be included in one or more kiosks. In one example, in addition to (or instead of) advertisements, informational information (such as how a product would work/operate) can be provided.

Still referring to FIG. 2A, the transactions portion of this process (see element 2007) follows the shopping portion of the process. As seen, the transactions portion of this process can comprise product demonstration (e.g., visual, auditory, olfactory and/or haptic) and/or purchase confirmation. In one example, the transactions portion of the process can comprise physical items being populated from back-office into a shelf as follows: (1) if available in stock the item is delivered to the location of customer 2001; (2) if the item is in a different store, the item can be transmitted via tactile interaction technology. In one example, customer 2001 can replace an item (that has previously been removed by customer 2001 from a kiosk/shelf) back to any kiosk/shelf in order for the item to be deducted from the bill of customer 2001. In another example, computer vision can be utilized that tracks customer 2001 picking up item, when customer 2001 leaves a kiosk area and/or when customer 2001 has picked up final bundled item upon completion. In one example, tactile interactions with an object can be simulated with a generic object core with a soft, deformable shell that is extruded or retracted by pneumatic motors within the object's shell. In another example, only one side of the product may be interactable at a time such that the user perceives the "back side" of an object (see RetroShape: Leveraging Rear-Surface Shape Displays for 2.5D Interaction on Smartwatches). In yet another example, force feedback and micro-power electric shocks may be utilized in a wearable (e.g. a glove, sock, shirt, hat, etc.) and used as a mechanism for sending tactile impressions to the user that correspond to the textures on a display or presented in a virtual or augmented reality system.

Still referring to FIG. 2A, the fulfillment portion of this process (see element 2009) follows the transactions portion of this process. As seen, the fulfillment portion of this process can comprise auto order assembly and/or delivery. In one example, the fulfillment portion of this process can comprise: (1) purchase realization with actual product (on site) and/or purchase triggers commerce delivery to car/home/etc.; (2) items delivered to a single package (box, bag, etc.) that is optimally packed as user is walking towards exit of store; and/or (3) federated fulfillment opportunities to other vendors to collect items. In one example, the fulfillment process can be in real-time. In one example, the fulfillment process can utilize 3D printing.

Figure 2B:
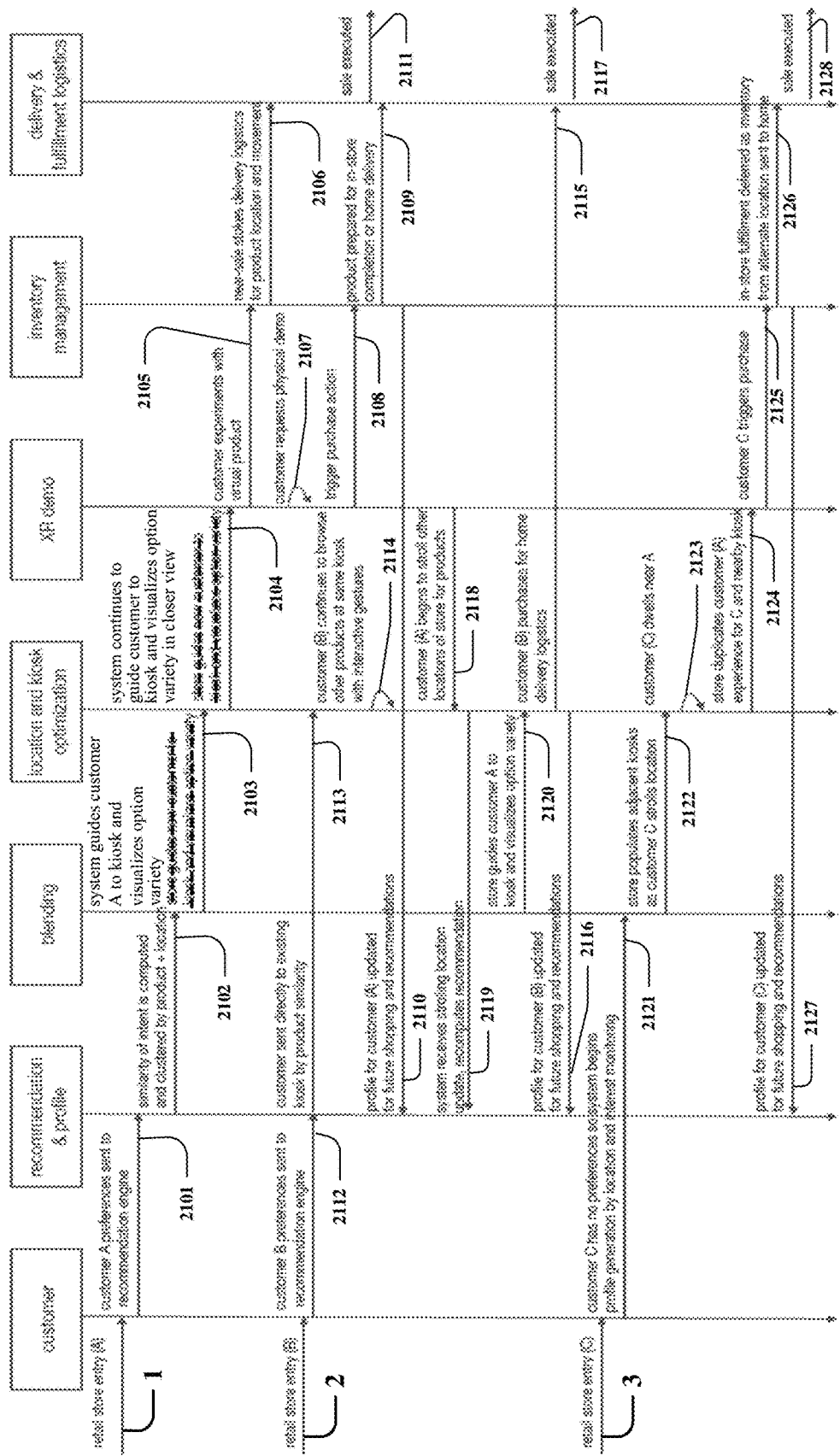
FIG. 2B is a block diagram illustrating an example, non-limiting embodiment of a process functioning within the communication network of FIG. 1 in accordance with various aspects described herein.

Referring now to FIG. 2B, an example process 2100 according to an embodiment will be described. This example process 2100 will be described primarily in connection with customers A, B, C (of course, the process can be carried out for any desired number of customers). As seen at time point (1), customer A enters a retail store. Next, customer A's preferences are sent to a recommendation engine (see arrow 2101). Next, similarity of intent is computed and clustered by product and location (see arrow 2102). Next, in one scenario, the system guides customer A to kiosk and visualizes option variety (see arrow 2103). Following the same action, the system continues to guide the customer A to kiosk and visualizes option variety in a closer view (see arrow 2104). Optionally, additional guidance, e.g. in step 2103 and/or 2104, may be skipped if the user does not need additional detail, is reviewing the item at an adjacent kiosk, or is using a secondary display (XR, a wearable display, a mobile display) directly. Next, the customer experiments with virtual product (see arrow 2105). Next, although the sale is not fully completed yet (e.g. a near-sale), certain orchestration components may be triggered that stoke delivery logistics for product location and movement (see arrow 2106). In addition, it is seen that after customer A experiments with virtual product, customer A can request physical demo (see arrow 2107). This experimentation with virtual product can trigger a purchase action (see arrow 2108). Responsive to the purchase action that is triggered, the product is prepared for in-store completion or home delivery (see arrow 2109); in addition, the profile for customer A is updated for future shopping and recommendations (see arrow 2110). Further, the sale can be executed (see arrow 2111).

Still referring to FIG. 2B, as seen at time point (2), customer B enters the retail store. Next, customer B's preferences are sent to a recommendation engine (see arrow 2112). Next, customer B is sent directly to existing kiosk by product similarity (see arrow 2113). Next, customer B continues to browse other products at the same kiosk with interactive gestures (see arrow 2114). Responsive to the browsing, customer B purchases for home delivery logistics (see arrow 2115); in addition, the profile for customer B is updated for future shopping and recommendations (see arrow 2116). Further, the sale can be executed (see arrow 2117).

Still referring to FIG. 2B, in another scenario, customer A begins to stroll to other locations of the store for products (see arrow 2118). Responsive to the strolling (which can be detected via any appropriate determination and/or tracking mechanism), the system receives a strolling location update and re-computes one or more recommendations (see arrow 2119). Further, the system guides customer A to a certain kiosk and visualizes option variety (see arrow 2120).

Still referring to FIG. 2B, as seen at time point (3), customer C enters the retail store. In this scenario, customer C has no existing preferences, so the system begins profile generation by location monitoring and/or by interest monitoring (see arrow 2121). Next, the system populates adjacent kiosk(s) with product(s) as customer C strolls to the location (s) of the kiosk(s) (see arrow 2122). In one example, the strolling can be detected via any appropriate determination and/or tracking mechanism. In one example, the populating of the kiosk(s) can comprise manual and/or automated delivery of the product(s) to the location(s). Next, customer C dwells near customer A (see arrow 2123). Responsive to customer C dwelling near customer A, the system duplicates the experience of customer A for customer C at a kiosk available to customer C (see arrow 2124). Next, customer C triggers a purchase (see arrow 2125). Responsive to the purchase that is triggered, in-store fulfillment is deferred as inventory from an alternate location is sent to the home of customer C (see arrow 2126); in addition, the profile for customer C is updated for future shopping and recommendations (see arrow 2127). Further, the sale can be executed (see arrow 2128).

Figure 2C:
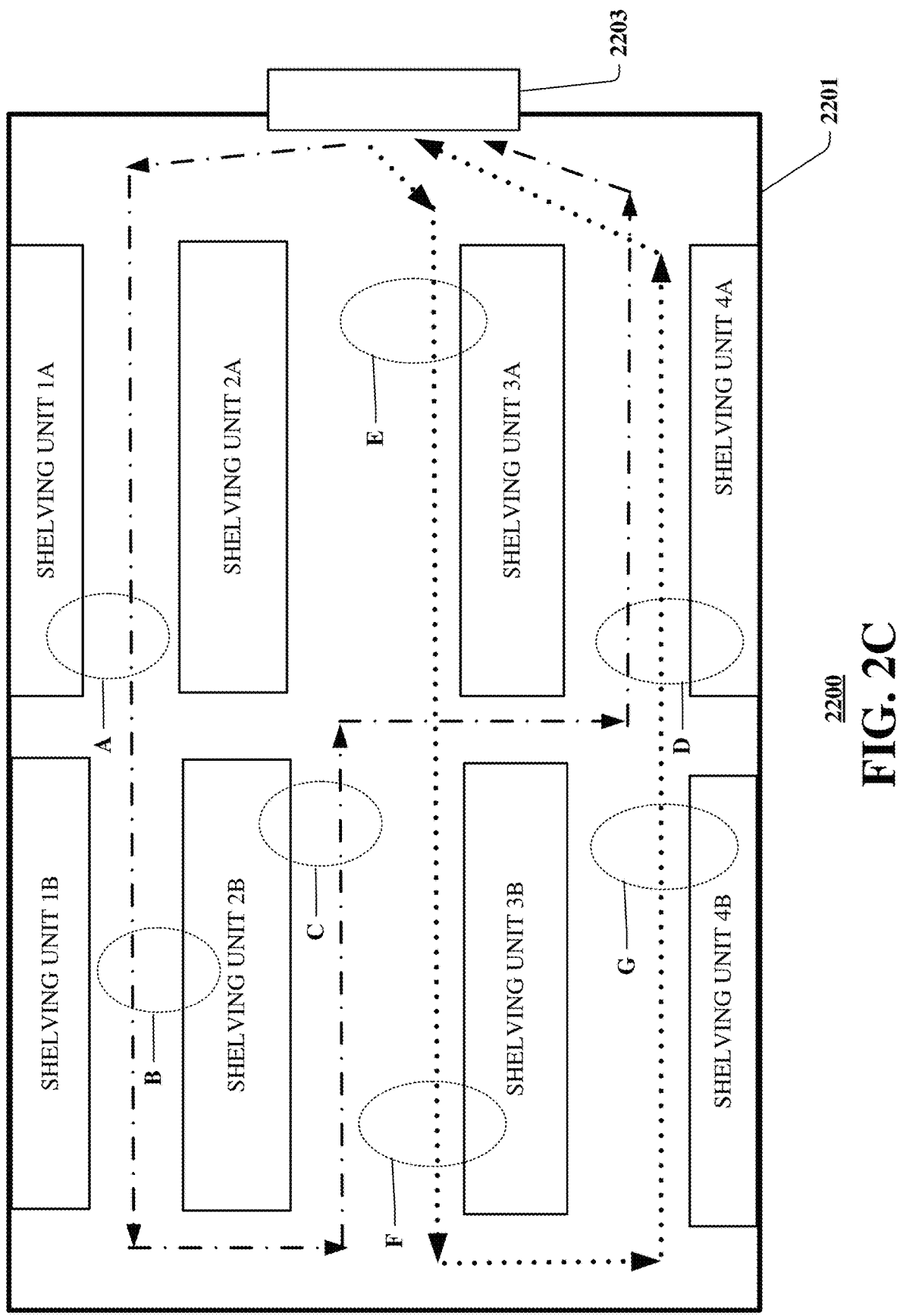
FIG. 2C is a plan view illustrating an example store layout associated with route/path/location planning and product supply of an embodiment.

Referring now to FIG. 2C, a diagram 2200 related to an example process according to an embodiment will be described. This diagram 2200 shows an example plan view of a retail store 2201. The entrance/exit of the store 2201 is shown as 2203. In this example, there are eight shelving units 1A, 1B, 2A, 2B, 3A, 3B, 4A, 4B. Various planning mechanisms as described herein can be used to plan customer routes through the store. In this example, a route for customer A is shown by the dash-dot line. This dash-dot line runs from the entrance to position "A", then to position "B" then to position "C" then to position "D", then to the exit. Further, in this example, a route for customer B is shown by the dotted line. This dotted line runs from the entrance to position "E", then to position "F" then to position "G" then to position "D", then to the exit.

Still referring to FIG. 2C, various mechanisms described herein can be used to provide to customer A one or more visualizations (e.g., advertisements, informational presentations) along the route planned for customer A (e.g., a respective visualization at each of positions "A", "B", "C", "D"). In another example, various mechanisms described herein can be used to dynamically supply product for customer A to the various shelving units at each respective position "A", "B", "C", "D"). In one example, movement by customer A to each position (and/or arrival by customer A at each position) can be determined via any desired tracking mechanism.

Still referring to FIG. 2C, various mechanisms described herein can be used to provide to customer B one or more visualizations (e.g., advertisements, informational presentations) along the route planned for customer B (e.g., a respective visualization at each of positions "E", "F", "G", "D"). In another example, various mechanisms described herein can be used to dynamically supply product for customer B to the various shelving units at each respective position "E", "F", "G", "D"). In one example, movement by customer B to each position (and/or arrival by customer B at each position) can be determined via any desired tracking mechanism.

Figure 2D:
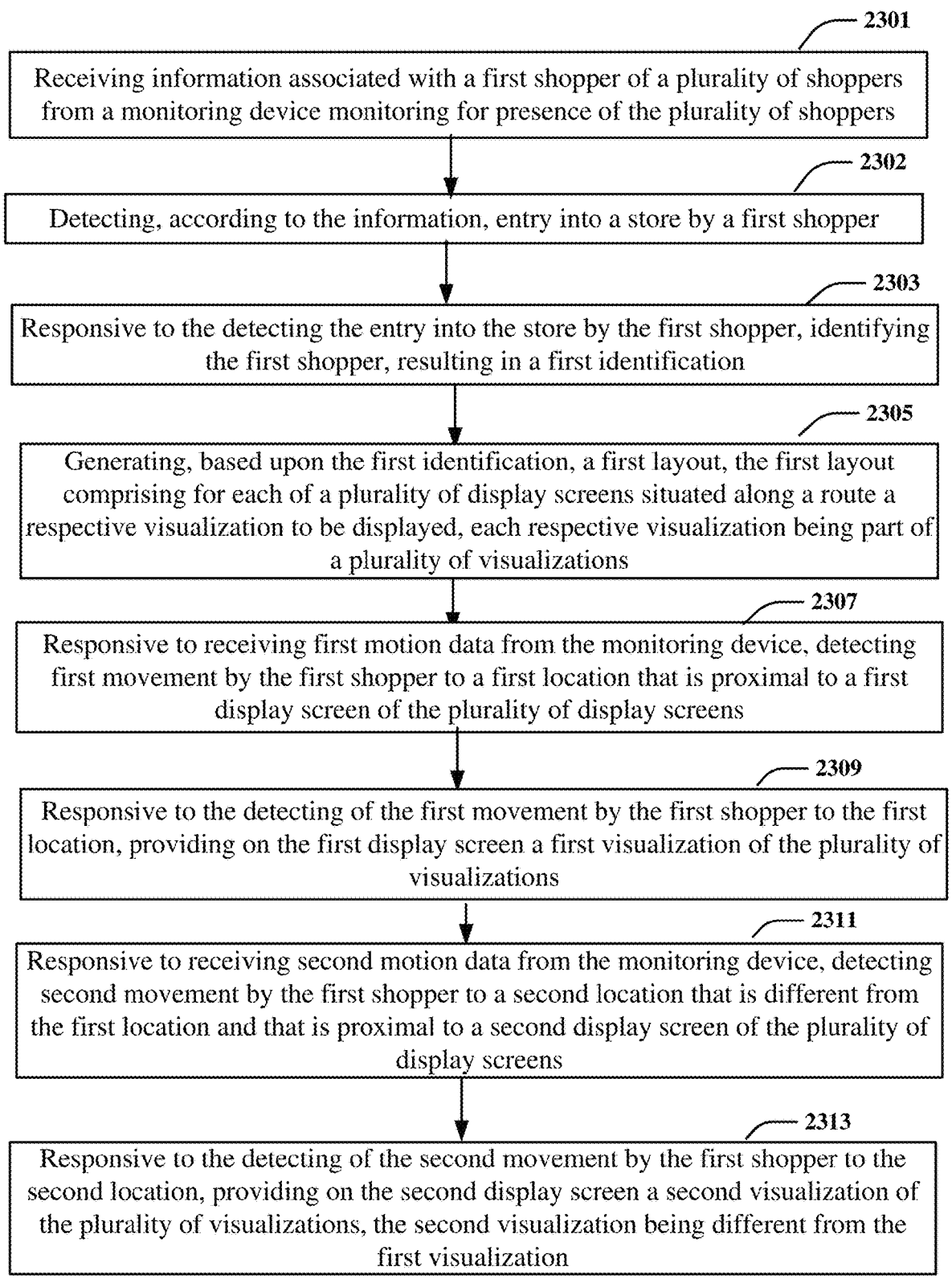
FIG. 2D depicts an illustrative embodiment of a method in accordance with various aspects described herein.

Referring now to FIG. 2D, various steps of a method 2300 according to an embodiment are shown. As seen in this FIG. 2D, step 2301 comprises receiving information associated with a first shopper of a plurality of shoppers from a monitoring device monitoring for presence of the plurality of shoppers. Next, step 2302 comprises detecting, according to the information, entry into a store by the first shopper. Next, step 2303 comprises responsive to the detecting the entry into the store by the first shopper, identifying the first shopper, resulting in a first identification. Next, step 2305 comprises generating, based upon the first identification, a first layout, the first layout comprising for each of a plurality of display screens situated along a route a respective visualization to be displayed, each respective visualization being part of a plurality of visualizations. Next, step 2307 comprises responsive to receiving first motion data from the monitoring device, detecting first movement by the first shopper to a first location that is proximal to a first display screen of the plurality of display screens. Next, step 2309 comprises responsive to the detecting of the first movement by the first shopper to the first location, providing on the first display screen a first visualization of the plurality of visualizations. Next, step 2311 comprises responsive to receiving second motion data from the monitoring device, detecting second movement by the first shopper to a second location that is different from the first location and that is proximal to a second display screen of the plurality of display screens. Next, step 2313 comprises responsive to the detecting of the second movement by the first shopper to the second location, providing on the second display screen a second visualization of the plurality of visualizations, the second visualization being different from the first visualization.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
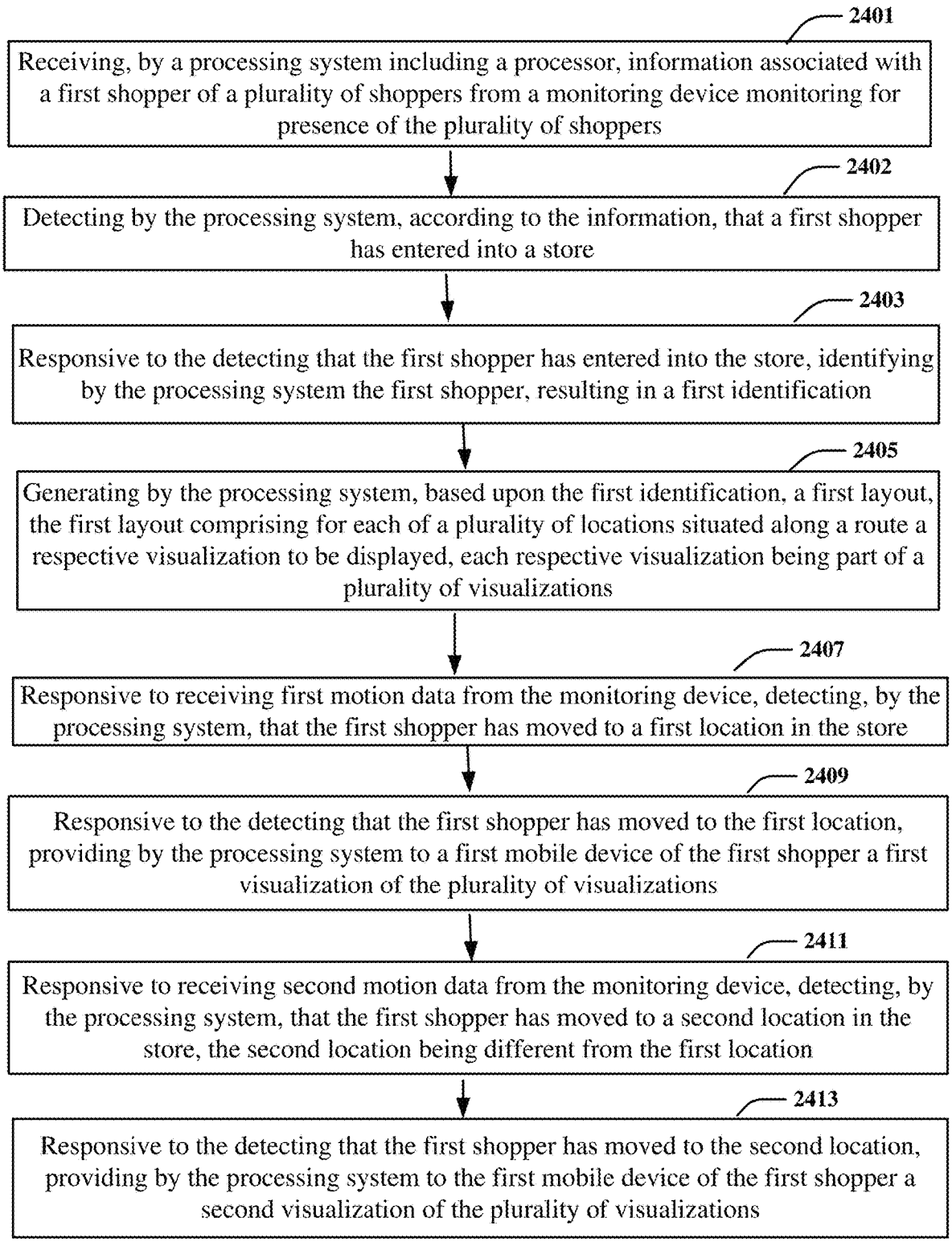
FIG. 2E depicts an illustrative embodiment of a method in accordance with various aspects described herein.

Referring now to FIG. 2E, various steps of a method 2400 according to an embodiment are shown. As seen in this FIG. 2E, step 2401 comprising receiving, by a processing system including a processor, information associated with a first shopper of a plurality of shoppers from a monitoring device monitoring for presence of the plurality of shoppers. Next step 2402 comprises detecting by the processing system, according to the information, that a first shopper has entered into a store. Next, step 2403 comprises responsive to the detecting that the first shopper has entered into the store, identifying by the processing system the first shopper, resulting in a first identification. Next, step 2405 comprises generating by the processing system, based upon the first identification, a first layout, the first layout comprising for each of a plurality of locations situated along a route a respective visualization to be displayed, each respective visualization being part of a plurality of visualizations. Next, step 2407 comprises responsive to receiving first motion data from the monitoring device, detecting, by the processing system, that the first shopper has moved to a first location in the store. Next, step 2409 comprises responsive to the detecting that the first shopper has moved to the first location, providing by the processing system to a first mobile device of the first shopper a first visualization of the plurality of visualizations. Next, step 2411 comprises responsive to receiving second motion data from the monitoring device, detecting, by the processing system, that the first shopper has moved to a second location in the store, the second location being different from the first location. Next, step 2413 comprises responsive to the detecting that the first shopper has moved to the second location, providing by the processing system to the first mobile device of the first shopper a second visualization of the plurality of visualizations.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
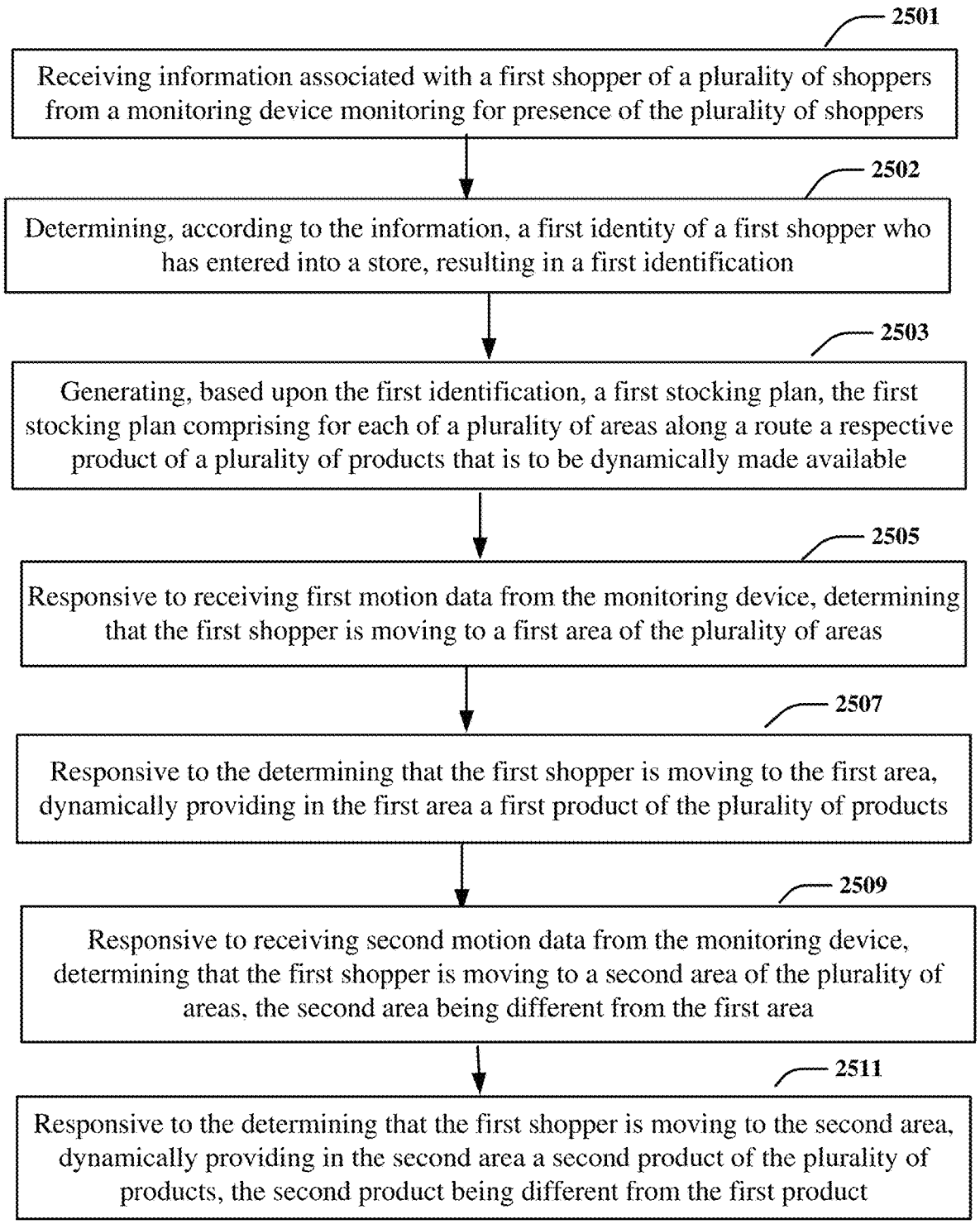
FIG. 2F depicts an illustrative embodiment of a method in accordance with various aspects described herein.

Referring now to FIG. 2F, various steps of a method 2500 according to an embodiment are shown. As seen in this FIG. 2F, step 2501 comprises receiving information associated with a first shopper of a plurality of shoppers from a monitoring device monitoring for presence of the plurality of shoppers. Next, step 2502 comprises determining, according to the information, a first identity of a first shopper who has entered into a store, resulting in a first identification. Next, step 2503 comprises generating, based upon the first identification, a first stocking plan, the first stocking plan comprising for each of a plurality of areas along a route a respective product of a plurality of products that is to be dynamically made available. Next, step 2505 comprises responsive to receiving first motion data from the monitoring device, determining that the first shopper is moving to a first area of the plurality of areas. Next, step 2507 comprises responsive to the determining that the first shopper is moving to the first area, dynamically providing in the first area a first product of the plurality of products. Next, step 2509 comprises responsive to receiving second motion data from the monitoring device, determining that the first shopper is moving to a second area of the plurality of areas, the second area being different from the first area. Next, step 2511 comprises responsive to the determining that the first shopper is moving to the second area, dynamically providing in the second area a second product of the plurality of products, the second product being different from the first product.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments provide a system (and associated methods) to marry supply chain and retail experience using in-person product recommendations.

As described herein, various embodiments provide for one or more of the following: (1) in-store shopping experience that is driven by market recommendations and/or by local shopping habits of current customers in-store (in one specific example, one or more items can dynamically be populated at (e.g., dynamically delivered to) one or more kiosks); (2a) using artificial intelligence (AI) and/or machine learning (ML), guide customers with unrelated needs to potential buy opportunities (e.g. a customer came in to a store shopping for wallet/accessories, but programmatic placement of kiosk advertising and/or programmatic placement of one or more physical items puts other apparel adjacent to (and/or in the line of sight of) the customer); (2b) opportunistic socialization for enhanced marketing—for instance, with gradual blending of similar interests at a location, users may peer select to purchase items not previously consumed; (3a) inventory display and management is simplified—for instance, virtually display items instead of having the items manually fixed/placed to a location or kiosk; (3b) automation of stocking as "just in time"; (4a) using XR (e.g., any desired experience or reality—for instance, virtual reality, augmented reality, holograms) and live experience for "try before buy"; consumer connection to product for multi-sensory experience; one scan of product on supply intake; and experience of product at other kiosk (s); (4b) linkage to secondary assets (e.g., video "how-to", vetted social content, etc.); (5) federating supply for viewing across different stores regardless of inventory location (e.g., an in-person side to e-commerce/marketing).

As described herein, various embodiments provide for one or more of the following: (1) planning—store layout can be dynamically computed by automated recommendation and/or can be user-driven; for instance, when a given user visits the retail venue/market itself, recommendations can opportunistically be made to both satisfy the primary customer (the "given user" in this example) as well as attract additional customers by socialization—thus creating a "social gravity" around a product (e.g., customer A at kiosk A likes certain things—one or more preferences of customer A can be used to: i) show visualization(s) at kiosk B where customer B is shopping and/or ii) deliver to kiosk B one or more products; (2) shopping—facilitating on-demand stocking of products within a retail environment (instead of, for example, large, unused and external displays); XR experience of the individual products that may or may not be located at a single retail service; (3) transaction—facilitating back-end delivery and stocking; for example, such delivery/ stocking can comprise on-demand delivery to cars or homes without customer having to package and transport goods; in another example, such delivery/stocking can comprise a process wherein a customer leaves the store with some in-person fulfillment and some deferred fulfillment; in various examples, delivery options can be tailored to each customer's preferences.

As described herein, various embodiments provide for one or more of the following: (1) inventory stocking can be personalized—for instance, each kiosk/store is planned on demand by customer context; (2) the supply chain can be simplified because items can be provided at the customer location (e.g., at a particular shelf location) on-demand instead of typical in-store stocking; (3) the supply chain efficiency can be improved—thus mitigating costs of management; (4) inventory display and management can be simplified—for instance, each item can be virtually populated until needed; (5) sales can be optimized for each user by their own preference(s); (6) store footprint can be efficiently used—for instance, each kiosk/stand/shelving unit can be dynamically stocked for each user (or group of users); (6) enhanced marketing can be facilitated via opportunistic socialization—for instance, with gradual blending of similar interests at a location, users may peer select to purchase items not previously consumed; (7) leverage XR experience mechanisms (e.g., images, 360 degree visualization, animations of content).

As described herein, various embodiments provide for enhancing any retail experience and reducing supply chain complications by dynamic product delivery.

As described herein, various embodiments provide for one or more of the following: (1) strong navigational suggestions for users (e.g., existing users or new users) entering a store—for instance, as someone walks in they can either be directly lead to a free kiosk or gradually directed (e.g., via AR, phone, etc.) to place where similar products are being displayed; (2a) "store-as-a-service"—for instance, a modernized version of a co-op where exploration of items in interactive environment is included as an extra service tier (or as a try-before-buy option) from a particular vendor; (2b) allows multiple vendors to share a retail space with less overhead of running the retail space (e.g. AMAZON, BEST BUY, etc. can share a retail space to experiment with toys, computers instead of having individual footprints); (3) deeper customer insights, including expansion to other shopping intents—for instance, with constantly updating kiosks, allow users to explore their own needs as well as blended needs from others that walk near their kiosk; (4) elimination/reduction of shoplifting and loss—for instance, removal of traditional stocking methods with hands-on manipulation of objects reduced and physical delivery of items delayed until confirmed intent to buy, at store exit, or delivery to other location; and/or (5) alternate purchasing experience—for instance, from individual items, have monthly service model, where seamless store inventory tracking (what was purchased when) are billed in more convenient fashion.

As described herein, various embodiments provide for one or more of the following: (1) more quickly respond to needs and/or wants of users (this can be accomplished, for example, given knowledge of products and availability of other items); (2) take hands-off shopping experiences to the next level and allow items the person usually shops for to be auto-populated by back-end machinery; (3) analysis of data (e.g., from two or more people in line) in real-time to stock one or more items; (3) enable people to be self-navigated; (4) making one or more recommendations to a customer walking into a store based on prior similar purchase habits (by that customer and/or by other customers); (5) self-driving mobility within the store—for instance, can use A/B testing to direct a person among different directions based on recommendations and options along those paths; (6) application to one or more people based upon certain physical characteristics (e.g., children will likely be looking lower on a shelf unit as compared to adults; identify the height of the individual to optimally place where on the shelf unit the product is placed); (7) optimize where a person goes based on similarity to others (recommendations can also be used as inputs to avoid restocking all over); (8) a "big box" commerce experience combined with micro location and motion combined with individual preference and history; (9) logistics chain behind the shelves that is controlled by a control system; (10) mix of both search and discovery in the shopping context; (11) a "Face-time" like experience with a potential purchase (e.g., a robot-type manipulator moves the product around while the customer gives commands like "let me see the top of the box" and/or asks the system questions like "how heavy is the product"; (12) a "robot friend" mechanism (e.g., including a "personalized" mechanism that remembers a given customer and customizes itself to your personality and preferences).

As described herein, various embodiments provide for enablement of supply-chain robots to fetch each customer's favorite items. In one specific example, various food items can be fetched and placed into a "personalized foods" stocking area for a customer named "Joe". This stocking area feeds to the shelves of a store; the shelves in that store dynamically indicate the name "Joe's Favorites". Joe picks up the items from "Joe's Favorites" and leaves the store (facilitated, for example, by an automated purchase flow). Items get un-stocked (removed) from the shelves and the process repeats for future visitors. In one specific example, the "Joe's Favorites" items are so popular that other people keep grabbing them and Joe gains local celebrity as being the basis of a best-selling area.

As described herein, various embodiments provide for: (1) enablement of shallow depth of items in stock—for instance, just-in-time population of shelves; (2) linkage to other stores—for instance, more interactions because you can see and interact with the item(s); (3) personalized shelf placement (e.g., shuffle for people in aisle); (4) VR/AR stack that is dynamically populated—e.g., a bookshelf-sized kiosk that gets populated; (5) a display that can let the user use gestures to "swipe" to see related items; (6) a mechanism wherein if a user wants to see a physical item, the physical item is moved to the user's shelf/kiosk dynamically by back-end robotics; (7) enables a user to see into other stores and see collective of others; (8) linking to other cultures and environments to more easily explore; (9) personalized experience and/or attracting people to the experience; (10) socialization of the displays; (11) grouping similar products that would then populate on the side of a user's display to show blending of preferences; (12) keywords for what someone is looking at when they browse some section; (13) motivating people to walk around the store and discover other types of content; (14) seeding by initial profile and/or queries as someone walks up to the display; (15) alternate point of purchase option; and/or (16) "store-as-a-service"—for instance, come to a nondescript (unbranded or co-branded) location to allow exploration of items.

In various embodiments, users can opt-in to various features (e.g., identification and location tracking) described herein.

In various embodiments, users can opt-out of various features (e.g., identification and location tracking) described herein.

As described herein, mechanisms are provided to guide users through passages (e.g., through aisles between shelving units) in a store. In one example, the guidance can be via an end user device (e.g., a smartphone, a tablet).

In various embodiments, one or more on-line forums (such as user forums) can be provided (such as at a location of a product). In one example, the forums can be controlled by a marketing organization or department. In one example, the forums can host one or more demonstrations. In one example, a forum can be invite-only. In one example, a forum can be open to anyone desiring to enter.

In various embodiments, one or more on-line "panel discussions" can be provided (such as at a location of a product). In one example, the panel discussions can be controlled by a marketing organization or department. In one example, the panel discussions can host one or more demonstrations. In one example, a panel discussion can be invite-only. In one example, a panel discussion can be open to anyone desiring to enter.

In various embodiments a system (or systems) can coordinate the timing of various processes described herein.

In various embodiments a transaction fulfillment can comprise delivery to the customer at a "pop-up" store, delivery to a customer's house, delivery to a customer's car (e.g., in a parking lot), or any combination thereof.

In various embodiments a transaction fulfillment can comprise a customer shopping and then when done shopping picking up all items selected during the given shopping trip from a single location.

In various embodiments a transaction fulfillment can comprise digital fulfillment and/or physical fulfillment.

In various embodiments a transaction fulfillment can comprise physical fulfillment by one or more products being placed in a locker; by one or more products being placed via use of a false wall, by one or more products being placed via use of a robot (or similar device); by one or more products being placed via use of an air tube (or similar device), or any combination thereof.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of methods 2000, 2100, 2200. 2300, 2400, 2500 presented in FIGS. 1, 2A, 2B, 2C, 2D, 2E, 2F. For example, virtualized communication network 300 can facilitate in whole or in part presentation of in-store visualizations and/or supply of products to customers as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
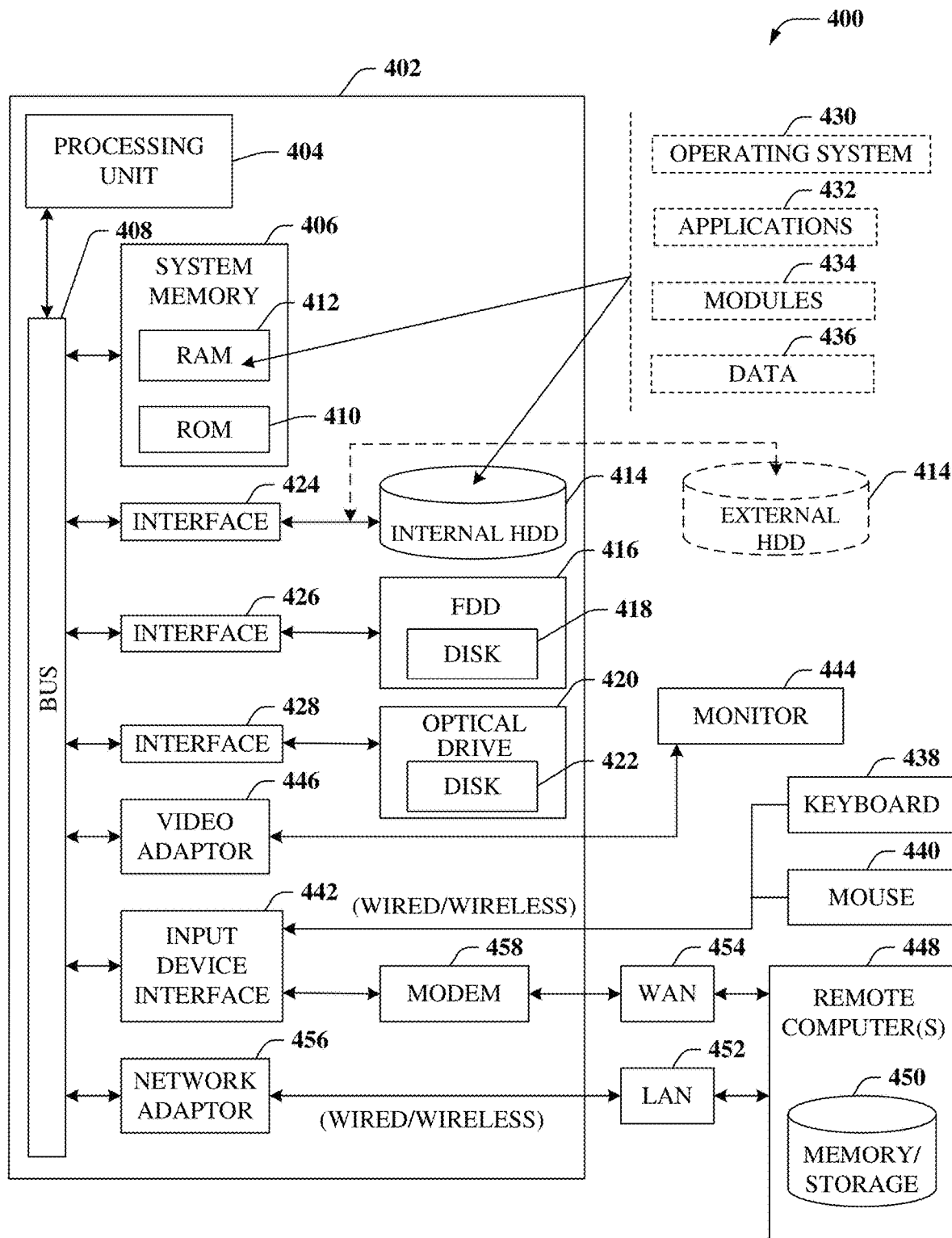
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part presentation of in-store visualizations and/or supply of products to customers as described herein.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
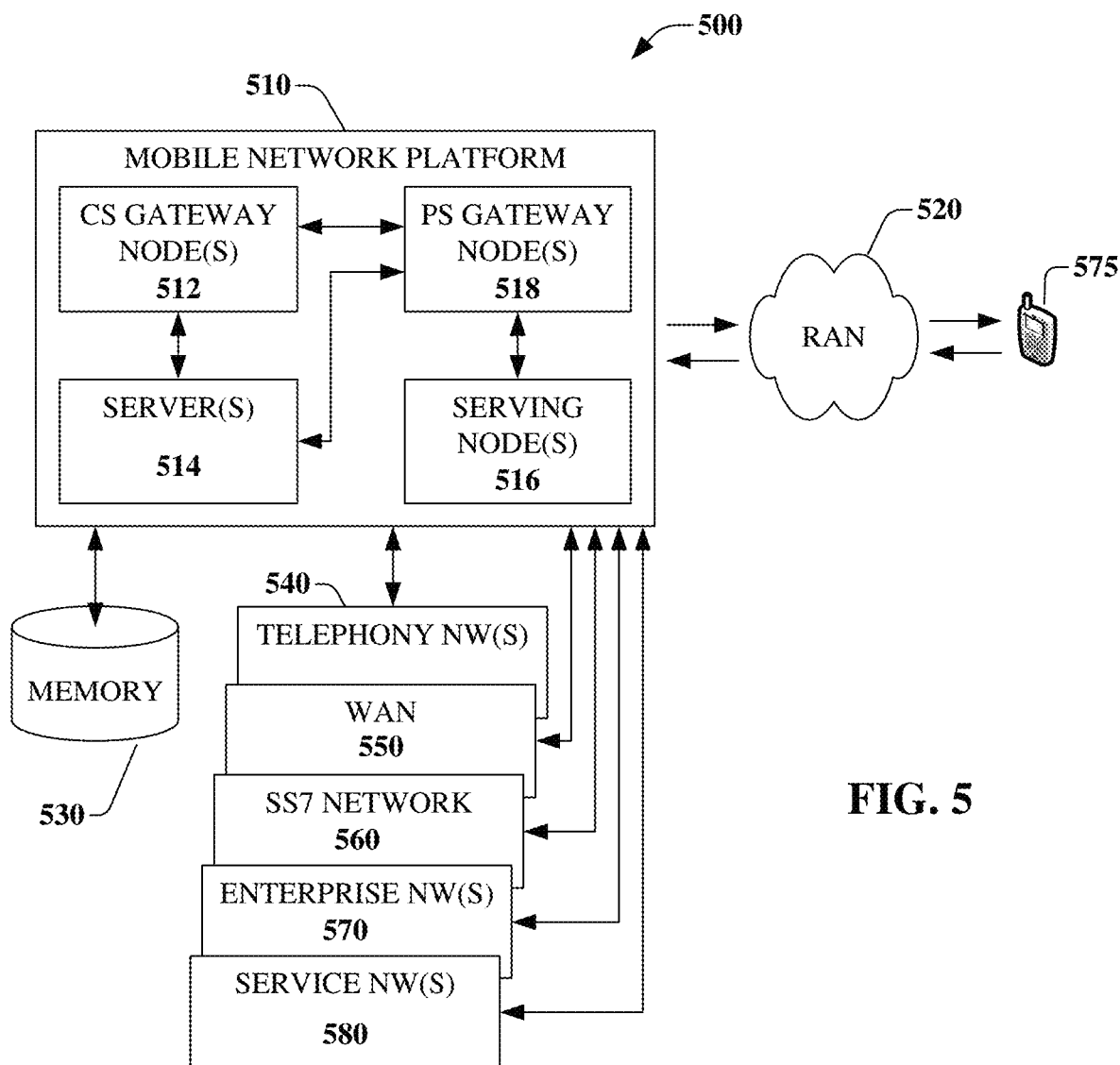
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part presentation of in-store visualizations and/or supply of products to customers as described herein. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1 that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
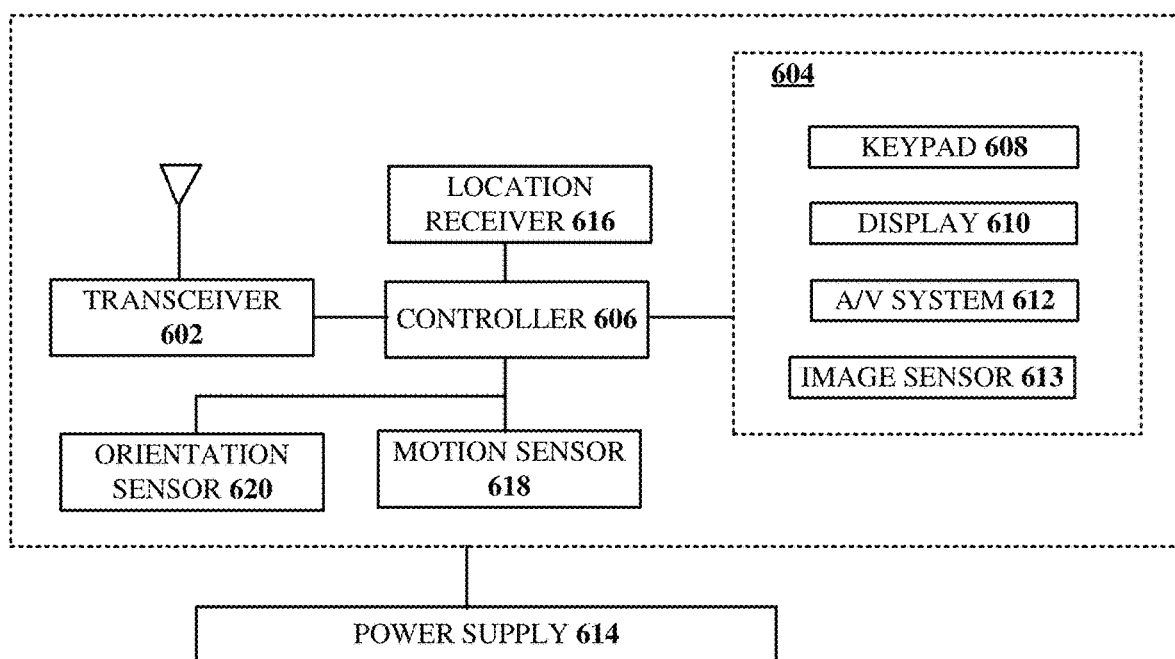
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part presentation of in-store visualizations and/or supply of products to customers as described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically presenting in-store visualizations and/or supplying products) can employ various AI-based schemes for carrying out various embodiments thereof. Moreover, the classifier can be employed to determine a ranking or priority of visualizations and/or products. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
      receiving information associated with a first shopper of a plurality of shoppers from a monitoring device monitoring for presence of the plurality of shoppers;
      detecting, according to the information, entry into a store by the first shopper;
      responsive to the detecting the entry into the store by the first shopper, identifying the first shopper, resulting in a first identification;
      generating, based upon the first identification, a first layout, the first layout comprising for each of a plurality of display screens situated along a route a respective visualization to be displayed, each respective visualization being part of a plurality of visualizations;
      responsive to receiving first motion data from the monitoring device, detecting first movement by the first shopper to a first location that is proximal to a first display screen of the plurality of display screens;
      responsive to the detecting of the first movement by the first shopper to the first location, providing on the first display screen a first visualization of the plurality of visualizations;
      responsive to receiving second motion data from the monitoring device, detecting second movement by the first shopper to a second location that is different from the first location and that is proximal to a second display screen of the plurality of display screens; and
      responsive to the detecting of the second movement by the first shopper to the second location, providing on the second display screen a second visualization of the plurality of visualizations, the second visualization being different from the first visualization.

2. The device of claim 1, wherein the detecting the entry into the store by the first shopper is performed via facial recognition applied to the first shopper by the monitoring device, via biometric detection applied to the first shopper by the monitoring device, via communication by the monitoring device with a smartphone utilized by the first shopper, via communication by the monitoring device with a radio frequency identification device (RFID) carried by the first shopper, or any combination thereof.

3. The device of claim 1, wherein:
   the first identification comprises identification of a name of the first shopper, identification of account information associated with the first shopper, or any combination thereof; and
   the monitoring device comprises a camera, a communication device that facilitates wireless coupling to a smartphone, an RFID reader, or any combination thereof.

4. The device of claim 1, wherein the first layout is generated based upon one or more preferences associated with the first shopper, based a first profile associated with the first shopper, based upon another profile associated with another person who is associated with the first shopper, or any combination thereof.

5. The device of claim 1, wherein the first display screen comprises a first kiosk display screen, wherein the second display screen comprises a second kiosk display screen, and wherein each visualization comprises a respective still image, a respective video, or any combination thereof.

6. The device of claim 1, wherein each visualization further comprises respective audio.

7. The device of claim 1, wherein the detecting the first movement by the first shopper to the first location comprises detecting that the first shopper has moved into a line-of-sight orientation relative to the first display screen.

8. The device of claim 1, wherein:
   the detecting the first movement by the first shopper to the first location is performed via facial recognition applied to the first shopper by the monitoring device, via biometric detection applied to the first shopper by the monitoring device, via communication by the monitoring device with a smartphone utilized by the first shopper, via communication by the monitoring device with a radio frequency identification device (RFID) carried by the first shopper, or any combination thereof; and
   the detecting the second movement by the first shopper to the second location is performed via facial recognition applied to the first shopper by the monitoring device, via biometric detection applied to the first shopper by the monitoring device, via communication by the monitoring device with a smartphone utilized by the first shopper, via communication by the monitoring device with a radio frequency identification device (RFID) carried by the first shopper, or any combination thereof.

9. The device of claim 1, wherein the operations further comprise:
   receiving additional information associated with a second shopper of the plurality of shoppers from the monitoring device;
   detecting, according to the additional information, entry into the store by the second shopper;
   responsive to the detecting the entry into the store by the second shopper, identifying the second shopper, resulting in a second identification;
   generating, based upon the second identification, a second layout that is different from the first layout, the second layout comprising for each of another plurality of display screens situated along another route, another respective visualization to be displayed, the another respective visualization being part of another plurality of visualizations;
   responsive to receiving third motion data from the monitoring device, detecting third movement by the second shopper to a third location that is proximal to a third display screen of the another plurality of display screens;
   responsive to the detecting of the third movement by the second shopper to the third location, providing on the third display screen a third visualization of the another plurality of visualizations;
   responsive to receiving fourth motion data from the monitoring device, detecting fourth movement by the second shopper to a fourth location that is different from the third location and that is proximal to a fourth display screen of the another plurality of display screens; and responsive to the detecting of the fourth movement by the second shopper to the fourth location, providing on the fourth display screen a fourth visualization of the another plurality of visualizations, the fourth visualization being different from the third visualization.

10. A method, comprising:

receiving, by a processing system including a processor, information associated with a first shopper of a plurality of shoppers from a monitoring device monitoring for presence of the plurality of shoppers;

detecting by the processing system, according to the information, that the first shopper has entered into a store;

responsive to the detecting that the first shopper has entered into the store, identifying by the processing system the first shopper, resulting in a first identification;

generating by the processing system, based upon the first identification, a first layout, the first layout comprising for each of a plurality of locations situated along a route a respective visualization to be displayed, each respective visualization being part of a plurality of visualizations;

responsive to receiving first motion data from the monitoring device, detecting, by the processing system, that the first shopper has moved to a first location in the store;

responsive to the detecting that the first shopper has moved to the first location, providing by the processing system to a first mobile device of the first shopper a first visualization of the plurality of visualizations;

responsive to receiving second motion data from the monitoring device, detecting, by the processing system, that the first shopper has moved to a second location in the store, the second location being different from the first location; and responsive to the detecting that the first shopper has moved to the second location, providing by the processing system to the first mobile device of the first shopper a second visualization of the plurality of visualizations.

11. The method of claim 10, wherein the first mobile device comprises a smartphone, a tablet, a notebook computer, a laptop computer, or any combination thereof.

12. The method of claim 10, wherein:

the first location is proximal to a first in-store display unit at which a first product, being presented in the first visualization, is made available to the first shopper for pick-up; and the second location is proximal to a second in-store display unit at which a second product, being presented in the second visualization, is made available to the first shopper for pick-up.

13. The method of claim 12, wherein:

the first product is made available to the first shopper for pick-up at the first in-store display unit dynamically, responsive to the generating of the first layout; and the second product is made available to the first shopper for pick-up at the second in-store display unit dynamically, responsive to the generating of the first layout.

14. The method of claim 10, further comprising:

receiving, by the processing system, additional information associated with a second shopper of the plurality of shoppers from the monitoring device;

detecting by the processing system, according to the additional information, that the second shopper has entered into the store;

responsive to the detecting that the second shopper has entered into the store, identifying by the processing system the second shopper, resulting in a second identification;

generating by the processing system, based upon the second identification, a second layout, the second layout comprising, for each of another plurality of locations situated along another route, another respective visualization to be displayed, the another respective visualization being part of another plurality of visualizations;

responsive to receiving third motion data from the monitoring device, detecting, by the processing system, that the second shopper has moved to a third location in the store;

responsive to the detecting that the second shopper has moved to the third location, providing by the processing system to a second mobile device of the second shopper a third visualization of the another plurality of visualizations;

responsive to receiving fourth motion data from the monitoring device, detecting, by the processing system, that the second shopper has moved to a fourth location in the store, the fourth location being different from the third location; and responsive to the detecting that the second shopper has moved to the fourth location, providing by the processing system to the second mobile device of the second shopper a fourth visualization of the another plurality of visualizations.

15. A machine-readable medium comprising executable instructions that, when executed by a processing system including a processor, facilitate performance of operations, the operations comprising:

receiving information associated with a first shopper of a plurality of shoppers from a monitoring device monitoring for presence of the plurality of shoppers;

determining, according to the information, a first identity of the first shopper who has entered into a store, resulting in a first identification;

generating, based upon the first identification, a first stocking plan, the first stocking plan comprising for each of a plurality of areas along a route a respective product of a plurality of products that is to be dynamically made available;

responsive to receiving first motion data from the monitoring device, determining that the first shopper is moving to a first area of the plurality of areas;

responsive to the determining that the first shopper is moving to the first area, dynamically providing in the first area a first product of the plurality of products;

responsive to receiving second motion data from the monitoring device, determining that the first shopper is moving to a second area of the plurality of areas, the second area being different from the first area; and responsive to the determining that the first shopper is moving to the second area, dynamically providing in the second area a second product of the plurality of products, the second product being different from the first product.

16. The machine-readable medium of claim 15, wherein:

the dynamically providing in the first area the first product comprises providing the first product in the first area before or concurrently with a first time that the first shopper has moved to the first area; and the dynamically providing in the second area the second product comprises providing the second product in the second area before or concurrently a second time that the first shopper has moved to the second area.

17. The machine-readable medium of claim 15, wherein:
the dynamically providing in the first area the first product comprises providing the first product in the first area in real-time as the first shopper is moving to the first area; and
the dynamically providing in the second area the second product comprises providing the second product in the second area in real-time as the first shopper is moving to the second area.

18. The machine-readable medium of claim 17, wherein:
the first product is provided in the first area in real-time by manual placement of the first product, by automated placement of the first product, or by any combination thereof; and
the second product is provided in the second area in real-time by manual placement of the second product, by automated placement of the second product, or by any combination thereof.

19. The machine-readable medium of claim 18, wherein:
the automated placement of the first product is performed by a first robotic device; and
the automated placement of the second product is performed by a second robotic device.

20. The machine-readable medium of claim 18, wherein the operations further comprise:

receiving additional information associated with a second shopper of the plurality of shoppers from the monitoring device;
determining, according to the additional information, a second identity of the second shopper who has entered into the store, resulting in a second identification;
generating, based upon the second identification, a second stocking plan, the second stocking plan comprising for each of another plurality of areas along another route another respective product of another plurality of products that is to be dynamically made available;
responsive to receiving third motion data from the monitoring device, determining that the second shopper is moving to a third area of the another plurality of areas;
responsive to the determining that the second shopper is moving to the third area, dynamically providing in the third area a third product of the another plurality of products;
responsive to receiving fourth motion data from the monitoring device, determining that the second shopper is moving to a fourth area of the another plurality of areas, the fourth area being different from the third area; and
responsive to the determining that the second shopper is moving to the fourth area, dynamically providing in the fourth area a fourth product of the another plurality of products, the fourth product being different from the third product.

\* \* \* \* \*